US009724779B2

(12) United States Patent
Feucht (10) Patent No.: US 9,724,779 B2
(45) Date of Patent: Aug. 8, 2017

(54) TOOL, MACHINE TOOL, MACHINING METHOD

(71) Applicant: SAUER ULTRASONIC GMBH, Stipshausen (DE)

(72) Inventor: Florian Feucht, Hüttlingen (DE)

(73) Assignee: SAUER ULTRASONIC GMBH, Stipshausen (DE)

( * ) Notice: Subject to any disclaimer, the term of this patent is extended or adjusted under 35 U.S.C. 154(b) by 0 days.

(21) Appl. No.: 14/440,267

(22) PCT Filed: Nov. 8, 2013

(86) PCT No.: PCT/EP2013/073360
§ 371 (c)(1),
(2) Date: May 1, 2015

(87) PCT Pub. No.: WO2014/072459
PCT Pub. Date: May 15, 2014

(65) Prior Publication Data
US 2015/0298243 A1    Oct. 22, 2015

(30) Foreign Application Priority Data

Nov. 8, 2012  (DE) .................. 10 2012 220 353

(51) Int. Cl.
*B23K 10/00*    (2006.01)
*B23K 10/02*    (2006.01)
(Continued)

(52) U.S. Cl.
CPC .......... *B23K 10/006* (2013.01); *B23K 10/027* (2013.01); *B23K 37/003* (2013.01); *H05H 1/28* (2013.01); *H05H 1/34* (2013.01)

(58) Field of Classification Search
CPC .......... H05H 1/32; H05H 1/28; B23K 10/006; B23K 10/027; B23K 37/003
(Continued)

(56) References Cited

U.S. PATENT DOCUMENTS 3,217,133 A * 11/1965 Mattmuller ............. B05B 7/226
219/121.11
3,471,674 A    10/1969 Gage
(Continued)

FOREIGN PATENT DOCUMENTS

DE    8508544 U1    5/1985
DE    3447304 A1    7/1986
(Continued)

OTHER PUBLICATIONS

Office Action dated Jan. 27, 2014, issued in corresponding German Patent Application No. 10 2012 220 353.2 (5 pages).
(Continued)

*Primary Examiner* — Mark Paschall
(74) *Attorney, Agent, or Firm* — Westerman, Hattori, Daniels & Adrian, LLP (57) ABSTRACT

A tool (10) for processing a workpiece in a processing machine has a connecting portion (11) which is at the machine side during operation and is preferably standardized, for connecting the tool with a numerically controlled machine tool (30), a plasma duct (44) for conducting a generated plasma, and an outlet portion (13) which is at the workpiece side during operation and is disposed at the end of the duct (44), and which comprises one or a plurality of outlets (22) for supplying the plasma to a workpiece surface.

16 Claims, 6 Drawing Sheets

(51) Int. Cl.
*H05H 1/34* (2006.01)
*B23K 37/00* (2006.01)
*H05H 1/28* (2006.01)

(58) Field of Classification Search
USPC .............. 219/121.5, 121.51, 121.48, 121.39, 219/121.45
See application file for complete search history.

(56) References Cited

U.S. PATENT DOCUMENTS

| | | | |
|---|---|---|---|
| 4,854,551 A | | 8/1989 | Griebeler |
| 5,012,065 A | * | 4/1991 | Rayson .................... H05H 1/30 219/121.48 |
| 6,118,097 A | * | 9/2000 | Kaga .................. B23K 26/1435 219/121.5 |
| 6,374,158 B1 | | 4/2002 | Fusaro, Jr. |
| 2001/0019042 A1 | | 9/2001 | Augeraud et al. |
| 2002/0144786 A1 | | 10/2002 | Chiang et al. |
| 2003/0155332 A1 | * | 8/2003 | Datta ........................ A61L 2/14 219/121.52 |
| 2005/0061774 A1 | | 3/2005 | Kelley et al. |
| 2006/0102606 A1 | | 5/2006 | Twarog |
| 2006/0180080 A1 | | 8/2006 | Mueller |
| 2007/0235417 A1 | | 10/2007 | Kuo |
| 2007/0284342 A1 | | 12/2007 | Jorgensen |
| 2008/0169272 A1 | * | 7/2008 | Brandt .................... H05H 1/34 219/121.39 |
| 2009/0145546 A1 | | 6/2009 | Inamoto et al. |
| 2010/0243619 A1 | | 9/2010 | Currier et al. |

FOREIGN PATENT DOCUMENTS

| | | |
|---|---|---|
| DE | 60119186 T2 | 1/2007 |
| DE | 112007001365 T5 | 5/2009 |
| EP | 1690601 A1 | 8/2006 |
| JP | 3-018966 U | 2/1991 |
| WO | 2006/099190 A2 | 9/2006 |
| WO | 2010/111695 A1 | 9/2010 |
| WO | 2013/055813 A1 | 4/2013 |

OTHER PUBLICATIONS

Office Action dated Jul. 16, 2013, issued in corresponding German Patent Application No. 10 2012 220 353.2 (7 pages).
International Search Report dated Apr. 11, 2014, issued in corresponding application No. PCT/EP2013/073360.
Office Action dated Jul. 1, 2016, issued in counterpart Chinese Patent Application No. 201380057949.9, with English translation. (17 pages).
Notification of Reasons for Refusal dated Aug. 9, 2016, issued in counterpart Japanese Patent Application No. 2015-541150, with English translation. (12 pages).

* cited by examiner

TOOL, MACHINE TOOL, MACHINING METHOD

The invention relates to a tool, a machine tool and a machining method for workpieces according to the preamble portions of the independent claims.

It has been known to machine workpiece surfaces by using a plasma. This machining process can have different purposes. It can serve for cleaning the workpiece surface or for removing material or for surface coating or for a surface modification. For this purpose tools are available which comprise a plasma generator and which have a suitable plasma outlet through which the generated plasma can be supplied to the workpiece surface. The tool is guided either manually or in an automatically controlled way by a robot.

When the workpiece is guided manually, the insufficient precision of the machining poses a problem. Moreover, it is laborious. However, it is also laborious to provide a separate machine, such as a robot, by means of which a tool suitable for the plasma processing of a workpiece surface can be automatically guided across the workpiece surface.

It is the object of the invention to provide a tool, a machine tool and a machining method, which make possible a simple implementation of methods for the plasma processing of workpieces.

This object is achieved by the features of the independent claims. Dependent claims are directed on preferred embodiments of the invention.

A tool for machining a workpiece in a processing machine has a preferably standardized connecting portion for connecting the tool with a matching connection of a numerically controlled machine tool, a fluid duct for conducting a generated plasma or another fluid or particle flow, and an outlet portion at the end of the fluid duct, which has one or a plurality of outlets for supplying the plasma or the fluid to a workpiece surface.

The tool can have a processing gas connection provided in the connecting portion, and a plasma generator which is connected to the process gas connection and the plasma duct. There is provided an energy supply system for supplying electric energy. It can have sliding contacts across the interface or can be or comprise a wireless inductive energy supply.

Together with such a tool a conventional machine tool for the plasma processing of a workpiece can be used. There can be used conventional control algorithms. There can also be used existing energy supply systems for supplying a tool with energy (across a possibly rotating interface).

A machine tool has a machine frame, a tool connection for a tool, as mentioned above, and a process gas connection for the tool, which comprises a process gas outlet at the tool side and a switching device upstream of the outlet, which is connected with the outlet and designed for the optional controlled connection of the outlet with a process gas duct or a coolant duct or, possibly, a source of flushing fluid of the machine or of other fluids. There can be provided a cleaning device for the outlet and for the switching device.

In this way an already existing machine-side fluid duct (e.g. for coolant, lubricant) including the interface towards the machine tool can be used for supplying the process gas to the tool. In the machine, in the stationary part, a switching system is provided by means of which one can select which fluid is supplied to the tool through the fluid duct. In the case of conventional tools this can be a coolant or a lubricant. In the case of the tool according to the invention it is the process gas.

The connection of the tool to the machine is effected at an appropriate interface of the generally rotatable spindle. Normally, the connection is designed according to "HSK" [hollow taper shank]. The spindle itself is usually rotatable and, during the operation of the plasma tool, can also be made to rotate at the desired controllable revolution speed. The fluid duct extends from the machine to the tool via a torque-proof connection in the spindle. Here, too, the existing structures (for coolant or lubricant) can be used.

In the case of a method for machining a workpiece in a machine tool by means of a tool as described above, a plasma is supplied to the workpiece surface by means of the tool mounted in the machine. The tool, just like conventional tools, can be guided in a numerically controlled way across the workpiece surface. The tool can be mounted in the machine spindle. The tool may rotate during operation. The process gas may be supplied to the tool via a connection that is also used for the supply of coolant to a tool, and in the machine tool one can switch between process gas supply and coolant supply in accordance with a control, and before the tool is mounted a cleaning step may take place, in particular a step of blowing the process gas or another gas through the machine-side supply structure.

With said method a plasma tool can be used in a conventional or an only slightly modified numerically controlled machine tool which also uses other tools. The plasma tool can be sorted as one of a plurality of other tools in a tool magazine and can be automatically accessible there by the machine tool, as it is also the case for other tools.

In the following, individual embodiments of the invention will be described with reference to the drawings.

In the following description and in the Figures same reference numerals refer to same components. Features of the invention are to be regarded as combinable with each other, even if their combination is not expressly mentioned, as far as their combination is not technically impossible. Descriptions of method steps are also to be regarded as descriptions of devices/means implementing these method steps and vice versa.

Figure 1:
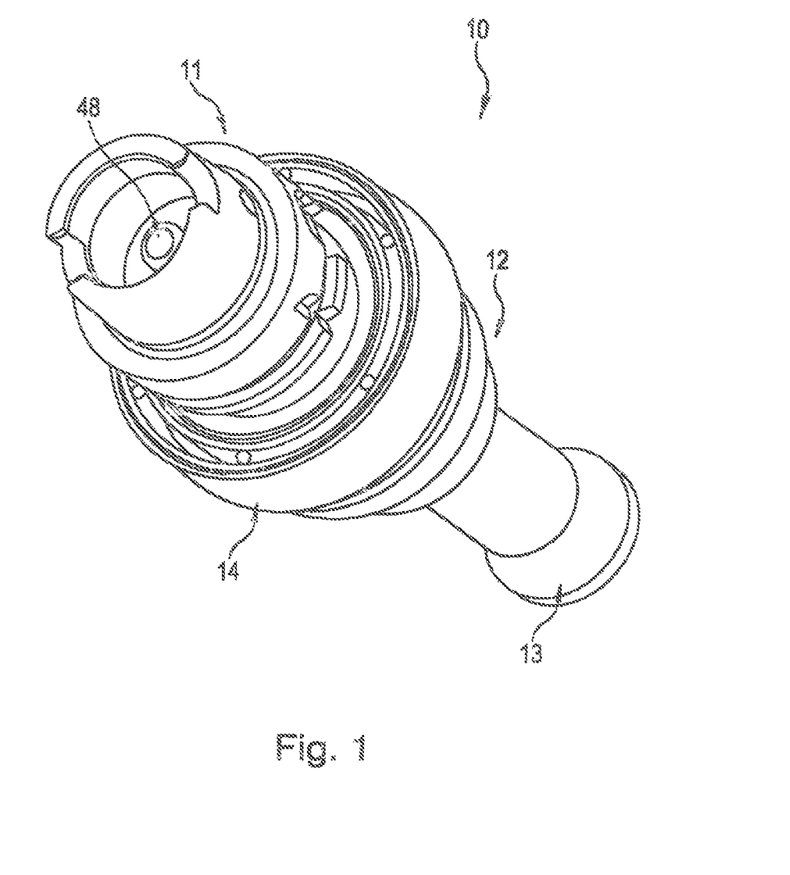
FIG. 1 shows a perspective view of a plasma tool.
Figure 2:
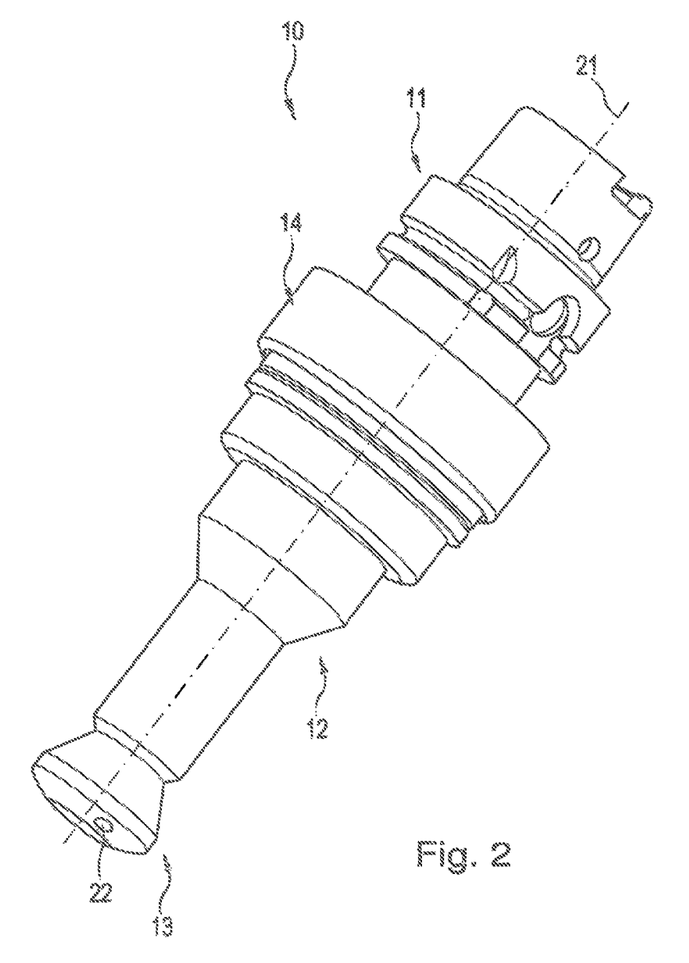
FIG. 2 shows a side view of a plasma tool.

FIG. 1 and FIG. 2 schematically show a perspective view and a side view of a tool 10 for processing a workpiece in a processing machine. The tool 10 comprises a machine-side connecting portion 11 and a tool-side outlet portion 13. In between there may be a central portion 12 for further components. In the interior of the tool 10 there is a plasma duct which feeds plasma to the outlet portion 13, in particular to plasma outlets 22 there, which are disposed at the end of the plasma duct 44. One or more plasma outlets 22 can be provided in the outlet portion 13.

21 symbolizes a tool axis. The tool can have a rotationally symmetrical structure or a rotationally invariant structure. It can rotate during operation.

The connecting portion 11 is preferably constructed according to a standard. It can be a HSK construction (DIN 69893) or a steep taper (DIN 69871). The connecting portion 11 or another portion of the tool can have a gripping portion for an automatic tool changer.

The plasma duct 44 feeds a plasma to the plasma outlet(s) 22. The plasma can be supplied from outside or can be generated in the tool 10 itself. It can be atmospheric pressure plasma which is generated from the ambient air.

In this way one obtains a tool which, just like other tools, can be used in a machine tool (i.e. insertion, removal, translational and/or rotational guiding along/across the workpiece surface, tool management in the magazine, programming of the machine, . . . ).

If plasma is to be generated in the tool itself, the tool comprises a plasma generator 45 which can be accommodated in the central portion 12 thereof and can comprise, on the one hand, electrical and electronic components, but, on the other hand, also components of a mechanical structure. Moreover, in this case an energy supply system 14, 43 can be provided. The energy supply system is preferably of a contactless/inductive type. At the tool side it has a receiver coil 14, which is interspersed by an alternating magnetic field. Advantageously, it further comprises a voltage shaping circuit 43a which converts the alternating voltage present at the coil into suitable quantities (frequency, amplitude, steady component, . . . ). The tool-side coil 14 can be designed and arranged symmetrically about the axis 21. It can have an annular design.

For the supply of the plasma or of the not yet ionized process gas a channel being concentric to the axis of rotation 21 can be used. Here, in particular, a channel may be used which is otherwise used for other fluids of other tools, in particular a channel for the supply of coolant and/or lubricant. In this respect, known and standardized constructions are already in use. The process gas supply can be designed accordingly.

Figure 3:
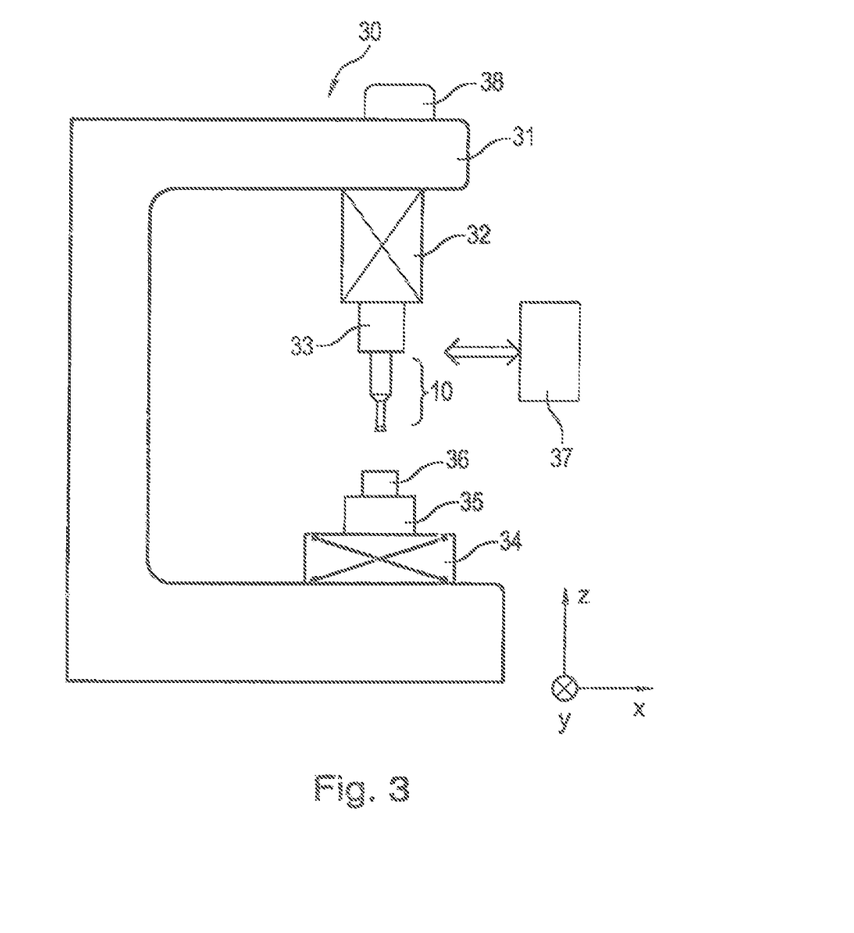
FIG. 3 schematically shows a machine tool.

FIG. 3 schematically shows a machine tool 30. 31 is a more or less stiff machine frame. 32 symbolizes a series of actuators by means of which the tool 10 can be translationally and/or rotationally adjusted and moved. 33 symbolizes a spindle which can make a tool 10 rotate. The tool 10 is designed as described above or below. 34 symbolizes actuators for a workpiece table 35, which, where appropriate, can also translationally and/or rotationally adjust the workpiece table 35. 36 symbolizes the workpiece itself.

37 symbolizes an open-loop/closed-loop control which, on the one hand, transmits signals in the direction of the process, in particular to the individual actuators 32, 34, and, where appropriate, also to the tool 10 itself and, where appropriate, also to other, not shown, components. Moreover, it can also receive signals, in particular signals fed back from sensors not shown in FIG. 3, also from one or more sensors in the tool. The control system 37 operates in accordance with a program for the processing of a workpiece 36.

38 symbolizes a source of fluid, in particular a source of process gas or a plasma source. Accordingly, there exists a fluid duct from the source 38 via the actuators 32 and the spindle 33 to the tool 10. The process gas can be ambient air, possibly also purified ambient air. In this connection, the intake port or an appropriate pump or the filter outlet can be regarded as the source 38. The source does not need to be fixedly mounted to the machine frame 31. Depending on the type of the fluid it can also be located closer to the tool 10. Between the tool 10 and the spindle 33 there are located the standardized tool fixture structures ("HSK", steep taper, . . . ).

The system can comprise a not shown fluid drive for feeding the fluid from the source in the direction of the workpiece. It can be designed as a pump or as a pressurized reservoir of a compressible fluid, which, if appropriate, comprises flow control valves. The drive can be located in the tool itself or in the machine tool.

Figure 4:
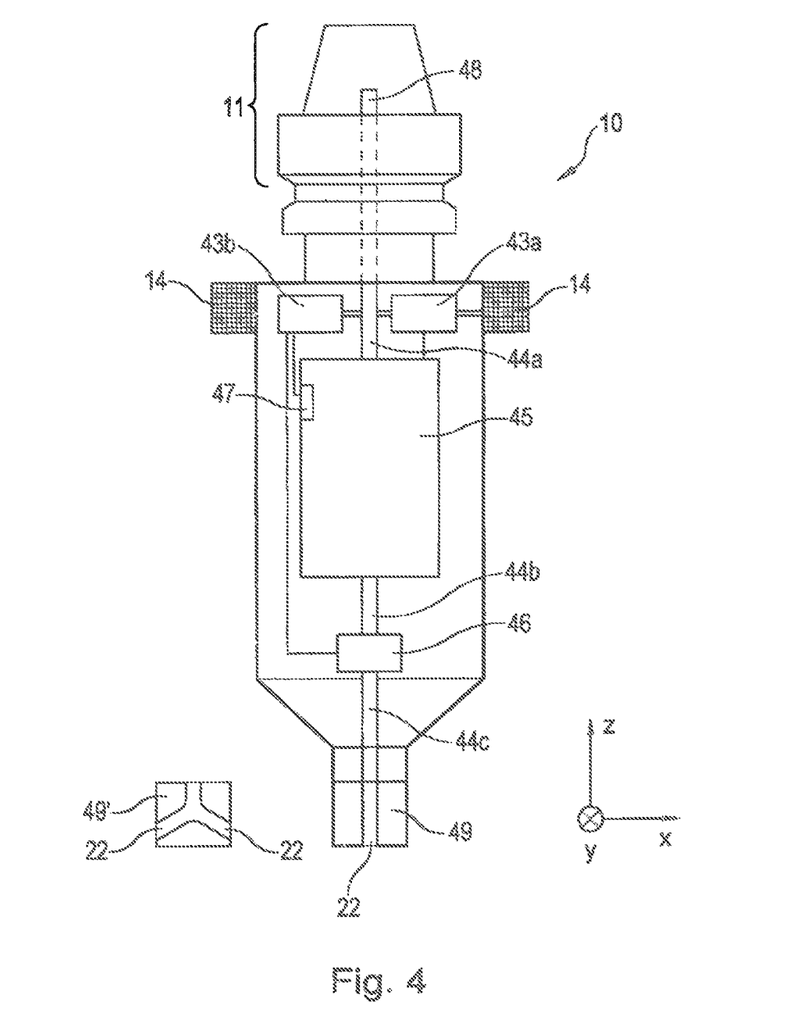
FIG. 4 schematically shows the inner structure of a plasma tool in an embodiment, FIG. 5 schematically shows components of the machine tool.

FIG. 4 schematically shows the internal structure of a tool 10. 48 symbolizes the tool-side fluid inlet or process gas inlet. The inlet can be located and extend coaxially to the axis of rotation 21 in the connecting portion 11. It can be designed according to a standard or a norm, in particular just as coolant inlets or lubricant inlets of other tools are designed. 45 symbolizes a plasma generator which is connected with an upstream fluid duct 44a and a downstream fluid duct 44b. Through the inlet 48 process gas is supplied to the generator 45.

14 symbolizes an energy source. It can be a coil/ring coil which inductively takes up energy. 43a symbolizes a voltage shaping circuit which is connected to the ring coil 14. It can comprise, e.g., a rectification and, where appropriate, a subsequent inversion as well as an amplitude control of the voltage to be output. The voltage shaping circuit 43a supplies the plasma generator 45 with the electric energy required by the latter, possibly also the fluid drive and other components. If electric energy is supplied, the plasma generator 45 generates a plasma from the process gas flowing in from above, which flows out below. In the interior or as a part of the generator 45 there can be provided open-loop and closed-loop components, actuators and mechanical or electrical/electronic devices.

The coil 14 cooperates with a stationary, not shown coil which can be configured such that it is only provided over a certain sector of the ring coil 14 and faces the same at a small distance in the z-direction. The—not shown—transmitter coil can be stationarily connected to the machine tool electrically and/or mechanically. It is mounted particularly in such a way that the access of a tool changer to the tool is not hindered.

The system design can be such that the tool is not only supplied with electrical energy, but it also receives control signals. These signals can by fed to the tool, e.g. by modulating signals at the machine side onto the supplied alternating power for the energy supply, which are then demodulated/decoded at the tool side and are then used accordingly. 43b symbolizes a component for this purpose, which may well have a comparatively complex structure. In this way external commands can be received. Then, one can accordingly act upon the plasma generator 45. Signals with external components can, however, also be exchanged directly via a suitable radio interface or a wired interface.

There can also be provided one or more flow control valves 46. What is shown is a valve downstream of the generator 45. Upstream, too, a valve is conceivable. A plurality of valves which may be appropriately controllable are conceivable (on/off or also gradual control). Furthermore, it is possible to implement an open-loop or closed-loop control within the tool. 47 symbolizes a sensor which, for example, detects state variables at or in the plasma generator 45 and conveys the same to the circuit 43b. There, they can either be directly used for the generation of open-loop control/closed-loop control signals, or they can be transferred back to the machine and used there.

At the bottom of FIG. 4 it is shown that the outlet portion 13 with the plasma outlet 22 can be formed as an exchangeable part 49. In this way different outlet designs and, possibly, also nozzle designs can easily be provided. 49' in FIG. 4, left side below, symbolizes an outlet design different from the one of the component 49. In the case of 49 an outlet 22 is shown which is directed downwards (in axial direction). In the case of 49', however, outlets 22 are shown which are more or less directed sideways. In this way different machining situations and requirements can be taken into account.

Figure 5:
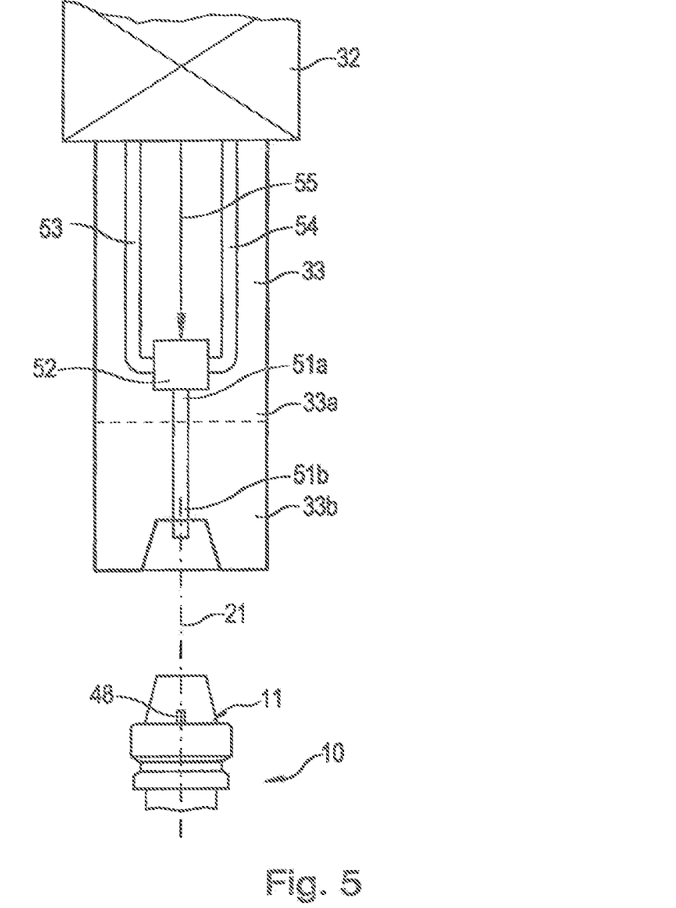

FIG. 5 schematically shows machine-side features. At the bottom of FIG. 5—also only schematically—the connecting portion 11 of the tool is shown. Above, the machine-side connection area is shown. It can be the driven end of a spindle, i.e. a tool connection 33b rotating during operation, which can be driven relative to a stationary part 33a at a desired revolution speed. The machine-side connection 51 towards the tool 10 is located in the rotating part 33b. Across the interface between the stationary part 33a and the rotating part 33b there extends a gas duct 51 with a portion 51a in the stationary part and a portion 51b in the rotating part, which have a torque-proof connection relative to each other. It can be located in the transition region between the stationary part 33a and the rotating part 33b and extend coaxially to the axis of rotation 21.

In the stationary part 33a a switching device 52 can be provided which works in dependence of control signals 55 which can originate from the control system 37. The switching device 52 can connect the outlet side (conduit 51a) to alternatively one of two or of a plurality of inlet conduits 53, 54. These inlet conduits 53, 54 can provide different fluids which can then be selected by the switching device 52. One of the inlet conduits 53 can, e.g., supply coolant and/or lubricant. Another one 54 can supply the process gas. A (not shown) further inlet conduit can supply another process gas. A further conduit (not shown, either) can comprise a flushing fluid for cleaning the downstream components (conduit 51, switching device 52) before the connection of the tool 10. The cleaning can be performed, for example, by blowing ambient air through the components.

Differently from what is shown in FIG. 5, the switching device 52 can also be located further upstream, e.g. in the machine frame 31, i.e. upstream of the actuators 32, so that only one single duct 51 must be directed across the actuators and the spindle.

Apart from the actual generation and supply of the plasma to the workpiece surface and the guiding of the tool across the workpiece surface by means of the machine, the working method for machining a workpiece surface can also comprise that, before the tool 10 is inserted into the machine, first a flushing process takes place during which conduits are rinsed with a flushing fluid (which can also be the process fluid/process gas) so that residues of other fluids (e.g. coolant) are removed from the conduits of the machine (in particular in the spindle and upstream thereof), e.g., by blowing them out. If necessary, by means of the switching device 52 a desired process gas can be selected by connecting the desired inlet with the outlet-side fluid duct 51. Before or after this step the tool 10 is inserted into the machine tool, in particular by means of the automatic tool handler, which can also take the tool from a magazine.

In addition to the hitherto described energy supply (metallic contact and/or inductive energy supply) or, instead thereof, the energy supply system can also comprise an energy storage in the tool. It can, e.g., be an exchangeable, possibly also rechargeable, battery.

Differently from what is shown, in the workpiece there can also be provided a fluid reservoir for the process gas or process fluid. There can be provided an exchangeable cartridge and a corresponding connection therefor. One or more flow control valves including an adapted and suitable control for them can be provided. The fluid connection towards the machine can then be omitted.

Figure 6:
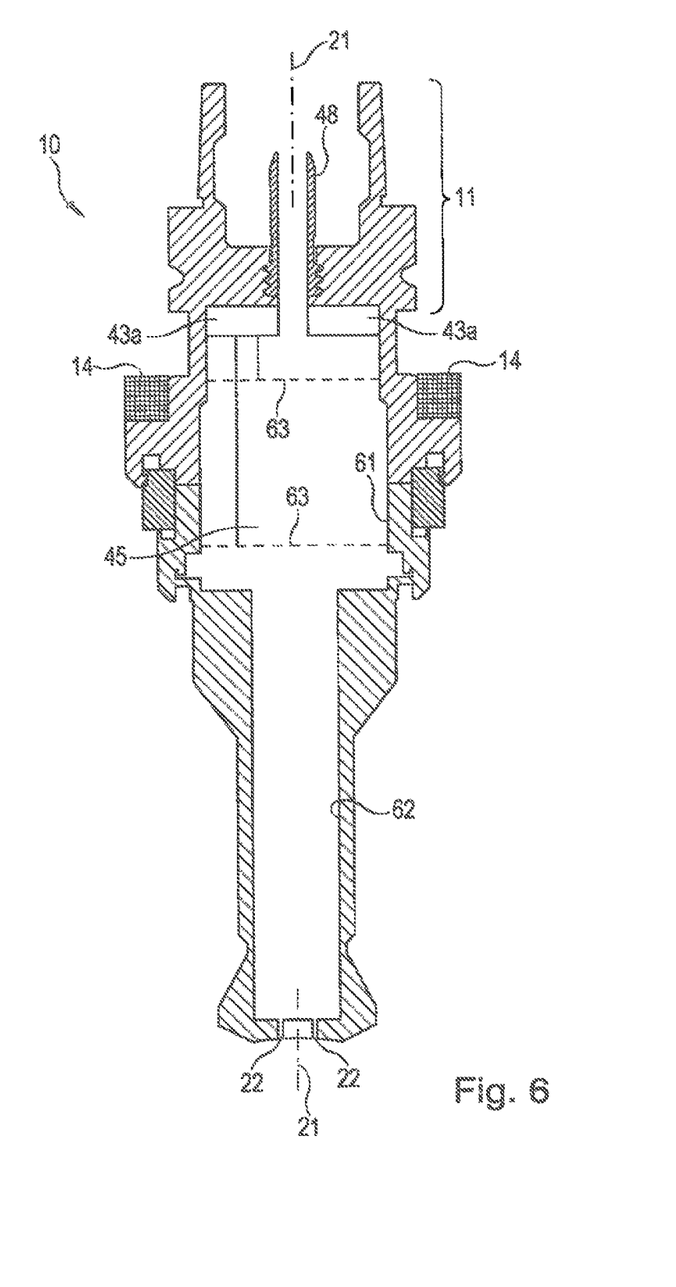
FIG. 6 shows a further type of the inner structure of the tool.

FIG. 6 shows, as a schematic sectional drawing, an inner structure of the tool, which has been modified as compared to FIG. 4. Generally, the plasma generator 45 and/or the conduits 44 need not be designed as separate components built into the tool housing, but can use the tool body or its walls 61, 62 themselves as duct wall 62 and/or generator wall 61. In the region of the plasma generator, in the inner space of the tool, which is defined by the wall region 61, the necessary electrical or electronic devices and installations are present, which are symbolized by 63, for igniting and stably generating the plasma. The downstream tool wall 62 itself can then form the duct for guiding the plasma to the outlet 22.

The tool of FIGS. 1 and 2 can also be designed for the handling and the supply of other fluids or particles than plasma to a workpiece surface for the processing thereof. It can generally be designed for the supply of a liquid or gaseous fluid or of a particle flow to a workpiece surface. The duct 44 in this case is a fluid or particle duct. The outlets 22 are fluid or particle outlets. The fluid can be liquid or gaseous. The generator can be omitted or can be constructed according to need. It can comprise a fluid or particle source, e.g., a sputter target, an electron source or the like. It can also be located directly in front of an outlet 22.

Accordingly, the use of the described tool 10 is not limited to the plasma processing of a workpiece surface. It can generally be used for the fluid processing or for the coating of workpieces, where a workpiece surface is to be processed by a gaseous or liquid fluid, in particular to be modified, processed by material removal or by material build-up. The fluid can be gaseous, and the atoms/electrons can be electrically neutral or ionized or can be present as a plasma. Instead of a plasma generator, other suitable conduits can be provided in the tool 10 or other generators for the generation of the respectively desired fluids or ions or particles. The control 43b in the tool 10 is then adapted to the respective conditions and can perform open-loop control or feed-back control tasks. Otherwise, the features of the tool, of the machine and of the method can be as described.

The invention claimed is:

1. A tool for machining a workpiece in a machine tool, comprising:
    a connecting portion, which is at the machine side during operation and is standardized to be interchanged with other tools, for connecting the tool with a numerically controlled machine tool,
    a plasma duct for conducting a plasma,
    an outlet portion which is at the workpiece side during operation and is disposed at the end of the duct and which comprises one or a plurality of outlets for supplying the plasma to a workpiece surface,
    a process gas connection provided in the connecting portion,
    a plasma generator which is connected with the process gas connection and the plasma duct, and
    a wireless inductive energy supply for the plasma generator.

2. The tool according to claim 1, characterized in that the process gas connection is designed for being connected with a machine-side connection which can be used for the coolant supply.

3. The tool according to claim 1, characterized in that the energy supply comprises a coil and a voltage-shaping circuit connected therewith.

4. The tool according to claim 1, which comprises a control system designed for receiving signals from a superordinated control system and/or from one or more sensors and for controlling tool components in accordance with the received signals and/or for transmitting signals to the superordinated control system.

5. The tool according to claim 4, characterized in that the control system comprises a decoder circuit for decoding signals which are superposed on the wirelessly received energy.

6. The tool according to claim 1, which comprises a plurality of plasma outlets, the plasma supply channels of which can be oriented in different directions.

7. The tool according to claim 1, characterized in that the workpiece-side outlet portion is a detachable and replaceable component.

8. The tool according to claim 1, which comprises one or more control valves for controlling the flow of the process gas and/or of the plasma.

9. The tool according to claim 1, characterized in that it is designed for being handled by a tool changer of the machine.

10. The tool according to claim 1, characterized in that it is designed for handling or generating a plasma from ambient air and/or for handling or generating a plasma from one of a plurality of selectable gases or gas mixtures.

11. The tool according to claim 1, which further comprises a sensor at or in the plasma generator.

12. A method for processing a workpiece in a machine tool comprising a tool according to claim 1, wherein a plasma is supplied to the workpiece surface by means of the tool mounted in the machine.

13. The method according to claim 12, wherein the process gas is supplied to the tool via a connection also used for the supply of coolant to a tool, wherein, in the machine tool, a switching between process gas supply and coolant supply takes place in accordance with a control system and wherein, before the mounting of the tool, a step of cleaning may be performed, in particular of blowing the process gas or another gas through the machine-side supply structure.

14. The tool according to claim 1, wherein said wireless inductive energy supply is a contactless energy supply.

15. The tool according to claim 1, wherein said wireless inductive energy supply includes a receiving coil contained on said tool and a stationary transmitter coil mounted to a machine too body and spaced a distance from said receiving coil when said tool is connected to said machine tool body.

16. A machine tool comprising
a machine frame,
a tool connection for a tool according to one or more of the preceding claims,
a workpiece table, and
a numerical control system for machine components,
characterized in that
the tool connection comprises a process gas connection for the tool, the process gas connection having a tool-side outlet and a switching device disposed upstream of the outlet, which is connected with the outlet and is designed for the controlled connection of the outlet with a process gas duct or a coolant duct or possibly a source of flushing fluid,
wherein a cleaning device for the outlet and for the switching device may be provided.

* * * * *